United States Patent [19]

Sethi

[11] Patent Number: 4,668,436

[45] Date of Patent: May 26, 1987

[54] PROCESS FOR PURIFYING A WORKING SOLUTION

[75] Inventor: Dalbir S. Sethi, Cranbury, N.J.

[73] Assignee: FMC Corporation, Philadelphia, Pa.

[21] Appl. No.: 808,801

[22] Filed: Dec. 13, 1985

[51] Int. Cl.[4] .............................................. C07C 50/18
[52] U.S. Cl. .................................... 260/369; 423/588; 423/590
[58] Field of Search .................. 260/369; 423/588, 590

[56] References Cited

U.S. PATENT DOCUMENTS

| | | | |
|---|---|---|---|
| 2,739,875 | 3/1956 | Sprauer et al. | 23/207 |
| 2,901,491 | 8/1959 | Eller et al. | 260/369 |
| 3,307,909 | 3/1967 | Reilly | 23/207 |
| 3,330,625 | 7/1967 | Baker et al. | 23/207 |
| 3,330,626 | 7/1967 | Oliver et al. | 260/369 |
| 3,767,779 | 10/1973 | Coingt | 423/588 |
| 3,912,766 | 10/1975 | Logan et al. | 260/369 |
| 3,965,251 | 6/1976 | Shin et al. | 423/588 |

FOREIGN PATENT DOCUMENTS 1121275  7/1968  United Kingdom .

OTHER PUBLICATIONS

Kirk-Othmer, *Encyclopedia of Chemical Technology*, vol. 13, 3rd Ed., J. Wiley & Sons, New York (1981) pp. 12-21.
Schirmann et al., *Hydrogen Peroxide in Organic Chemistry*, Ugine Kuhlmann, Lyons, France (1981) pp. 1 to 19. — Esso Brochure

*Primary Examiner*—Glennon H. Hollrah
*Assistant Examiner*—Raymond Covington
*Attorney, Agent, or Firm*—R. E. Elden; R. L. Andersen; E. G. Seems

[57] ABSTRACT

A process is provided to regenerate and purify a working solution for the manufacture of hydrogen peroxide by the reduction and oxidation of a solution of alkylated anthraquinones and derivatives. The regeneration and purification is effected by removing inerts by contacting the working solution and an noncyclic hydrocarbon to form a liquid first phase and a second phase, separating the two phases and recovering both the noncyclic hydrocarbon and the purified working solution by distillation.

20 Claims, No Drawings

PROCESS FOR PURIFYING A WORKING SOLUTION

The present invention is a process for regenerating and purifying a working solution used to produce hydrogen peroxide by the reduction and oxidation of an alkylated anthraquinone. More particularly, the invention is a process for removing inert contaminants from a working solution of a working compound in an inert solvent by forming a two-phase system, separating the phase containing the purified working solution from the phase containing the inert contaminants and recovering the purified working solution.

The anthraquinone process for manufacturing hydrogen peroxide is well known. The process employs a substituted anthraquinone or a derivative thereof herein called the working compound which is cyclically reduced and when oxidized forms hydrogen peroxide and regenerated working compound. The working compound is usually dissolved in a mixture of solvents, the first a solvent for the working compound in the oxidized form and the second a solvent for the working compound in the hydrogenated or reduced form. During each cycle part of the working compound is converted into a by-product. A hydrogenated derivative tetrahydroanthraquinone effective in producing hydrogen peroxide in the process is considered to constitute part of the working compound. An epoxytetrahydroanthraquinone although ineffective in producing hydrogen peroxide can be converted into a working compound and is considered to be part of the available quinone or available working compound. Other derivatives, such as, octahydroanthraquinone that has a very slow rate of producing hydrogen peroxide, and anthrone derivatives and polymers which are incapable of producing hydrogen peroxide are collectively classified as "inerts". Hydrogenated derivatives of the solvents also are classified as inerts.

U.S. Pat. No. 3,767,779 to Coingt teaches a process in which the concentration of inerts is maintained at 15% or more to thereby increase the solubility of working compound in the working solution. As the inerts are derivatives of the working compound, it is reasonable to expect that the basic chemistry truism, "like dissolves like" applies and that inerts and the working compound would be mutually soluble in each other. However, such a high concentration of inerts in the working solution increases the specific gravity of the working solution causing difficulty in the extraction of the hydrogen peroxide. Further, the high concentration of inerts also increases the viscosity of the solution which decreases the efficacy of the hydrogenation step, the oxidation step and the extraction step.

Other than the teaching of U.S. Pat. No. 3,767,779, the teaching of the prior art as a whole is that inerts are undesirable in the working solution. As early as 1956, U.S. Pat. No. 2,739,875 to Sprauer et al. disclosed the problem of the conversion of the working compound into ineffective derivatives and teaches a process to convert some of the derivatives such as the epoxy compounds into working compounds. Kirk-Othmer, *Encyclopedia of Chemical Technology*, Third Ed., Vol. 13, John Wiley & Sons, N.Y. (1981) discloses at page 20 that degradation products (inerts and epoxy derivatives) formed during the cyclic reduction and oxidation of the working compound *must be removed or regenerated*. Processes disclosed useful for removing or regenerating the working compound by Kirk-Othmer include processes both for regenerating an epoxide and processes for removing inerts. Processes cited there include dehydrogenating in the presence of an olefin and treatment with an alkali, an acid, a metal oxide, a metal chloride, a metal silicate or aluminosilicate, a dithionate, oxygen or ozone. Other processes disclosed therein include washing with water, recrystallizing, extracting with alcohols, distilling, ion-exchanging and heating in an inert atmosphere.

The process of the present invention provides a process for removing inert contaminants from a working solution containing a working compound for the production of hydrogen peroxide by the cyclic oxidation and reduction of an alkylated anthraquinone comprising the steps of (a) combining the working solution and a sufficient quantity of a noncyclic hydrocarbon having a solubility parameter of less than 8, a hydrogen bonding index of 0 and a dipole moment of 0, thereby forming a first liquid phase and a second phase, the second phase having a greater specific gravity than the first liquid phase, (b) separating and withdrawing at least a portion of the second phase from the first liquid phase, and (c) recovering the noncyclic hydrocarbon from the first liquid phase.

Unexpectedly it has been found that the active working compound is found primarily in the purified working solution while the second phase comprises primarily inerts with only a small proportion of active working compound. This is contrary to the teaching of the patent to Coingt from which it would be expected that the working compound would be preferably found with the inerts.

The solubility parameter, the hydrogen bonding index and the dipole moment are all well known parameters. The solubility parameter of a compound is equal to the heat of vaporization minus the work done through volume expansion on evaporation divided by the molar column. The units are cal $^{0.5}$/cm $^{1.5}$. The hydrogen bonding index is determined by the spectroscopic method taught by Gordy et al., *Journal of Chemical Physics*, 7, 93–99 (February 1939); 8, 170–177 (February 1940) and 9, 204–214 (March 1941). Tables of the dipole moment of compounds are readily available in the literature. The units are $10^{-18}$ esu-cm.

It is not critical for the noncyclic hydrocarbon employed in the process to be a liquid at standard temperature and pressure, provided that a first liquid phase and a second phase is formed. For example, when butane or propane and a working solution are combined under sufficient pressure or at a sufficiently low temperature to form a first liquid phase and a second phase.

It is critical for the noncyclic hydrocarbon to have a solubility parameter of less than 8. It is desirable for the solubility parameter to be less than 7.5 as it has been observed that for a normal alkane the efficacy increases inversely with the solubility parameter. The solubility parameter of alkanes is also observed to decrease as the branching increases. Therefore, noncyclic hydrocarbon compositions of an indefinite composition such as commercial eicosane which has a solubility parameter of 7.8 and a hydrogen bonding index of zero and a dipole moment of zero would be suitable for use in the process.

The temperature for combining and separating the noncyclic hydrocarbon and the working solution is not critical provided a first liquid phase and a second phase are present. It is clear that the solubility of the second phase in the first liquid phase increases with temperature so that progressively less of the second phase can be separated from the first liquid phase as the temperature increases. Although a second phase can exist at 50° C. or higher it is desirable to maintain the temperature below 22° C. On the other hand, although the process is operable at −15° C. or below the concentration of the working compound in the second phase increases with a decrease in temperature so much that a temperature of between −10° C. and 30° C. is generally preferred.

Any conventional method for recovering the noncyclic hydrocarbon from the first liquid phase may be employed, such as distillation. The temperature for distilling the first liquid phase to recover the noncyclic hydrocarbon depends on the relative boiling points of the noncyclic hydrocarbon and of the components of the working solution. For example, if the noncyclic hydrocarbon is pentane which has a boiling point of 36° C., and if the working solution contains as its lowest boiling constituent a solvent, such as mesitylene which has a boiling point of 164° C., then the noncyclic hydrocarbon can easily be recovered as a distillate with the purified working compound as a residue. On the other hand, if the noncyclic hydrocarbon is dodecane with a boiling point of 216° C. and the working solution contains mesitylene as its lowest boiling constituent, the mesitylene and dodecane can easily be distilled separately from the first liquid solution to leave a residue which when combined with mesitylene will provide reconstituted purified working solution and the recovered dodecane. Alternatively, the mesitylene and dodecane can be codistilled from the first liquid phase and subsequently separated. The optimum distillation temperatures and conditions can be easily determined by one skilled in the art without undue experimentation.

Although the noncyclic hydrocarbon and the working compound can be combined in any order, it is preferable to introduce the working compound into the noncyclic hydrocarbon until a sufficient quantity has been added to form a second phase. When combined slowly in the preferred sequence the second phase is more likely to be crystalline rather than noncrystalline. Further, one will readily recognize that the amount of working compound entrapped in the second phase will be less than in the preferred sequence.

The proportions of noncyclic hydrocarbon and working solution combined to form the first liquid phase and the second phase are not critical and depend on the solubility properties of both and the quantity of inerts present in the working solution. For example, in a screening test a substantial quantity of a second phase has been observed when combining as little as 3 parts by volume of an noncyclic hydrocarbon to one part working solution. As much as seven parts by volume of noncyclic hydrocarbon to one part of working solution has produced excellent results. However, as the volume of noncyclic hydrocarbon increases, the cost of the process, particularly the distillation step, increases. The optimum proportions of noncyclic hydrocarbon and working solution can easily be determined by standard cost-benefit calculation techniques.

The working solution can be optionally either in the neutral form or partially hydrogenated. The degree of hydrogenation is expressed as "titer" (a solution with a titer of 400 will produce 1 gram mol of hydrogen peroxide per liter on oxidation). A solution with a titer of about 0 is a neutral work solution, usually observed before the hydrogenation step. Practicing the process with neutral working solution has the advantage of not requiring excluding air to maintain the titer. However, practicing the process with hydrogenated working solution has the advantage of a greater removal of inerts. Optionally, the process can be in two stages, such as, the first stage employing neutral working solution with a zero titer and the second stage employing hydrogenated working solution.

As the titer of the working solution increases, the concentration of working compound in the second phase increases such that it is desirable for the titer to be below 84. It is preferable for the hydrogenated working solution to have a titer of between 35 and 65, and particularly when the temperature of the separating step is −15° C. to 0° C.

The best mode of practicing the invention will be clear to one skilled in the art from the following nonlimiting examples.

Qualitative tests were performed by combining approximately three to four parts of a possible noncyclic hydrocarbon with one part of working solution in the neutral form. Formation of a visible second phase was recorded as a positive test.

Quantitative tests were performed by adding one part of working solution to seven parts by volume of noncyclic hydrocarbon at a constant temperature. A second phase formed instantly either as a mass of crystals or a sticky mass. After separation by decanting, filtering, or the like, the second phase was thoroughly washed with more of the noncyclic hydrocarbon at the constant temperature. The first liquid phase was distilled to recover the noncyclic hydrocarbon and to recover the purified working solution. Analyses were performed by NMR.

EXAMPLE 1

A neutral working solution was employed comprising about 10 parts by weight inerts, 10 parts by weight 2-ethylanthraquinone and 2-ethylanthrahydroquinone contained in 80 parts by weight of a solvent, the solvent consisting of 3 parts by volume of a mixed aromatic solvent boiling between 182° C. and 204° C. and 1 part by volume trioctyl phosphate. The working solution was added to 7 parts of n-heptane at 22° C., 0° C. and −10° C. The results are presented in summary form as Table I.

EXAMPLES 2 TO 4

Example 1 was repeated using hydrogenated working solution with titers of 33, 64 and 84.

EXAMPLE 5

Example 1 was repeated using n-pentane as the noncyclic hydrocarbon.

EXAMPLES 6 TO 8

Example 5 was repeated at 0° C. only using hydrogenated working solution with titers of 34, 64 and 84.

EXAMPLE 9

Example 1 was repeated initially with neutral working solution at 5° C. After the first noncyclic hydrocarbon, n-heptane, was distilled, the resulting purified neutral working solution was hydrogenated to titers of (a) 34, (b) 65 and (c) 85, and the second noncyclic hydrocarbon was added. The results are presented as previously, as Table II at temperatures of 22° C., 0° C. and −10° C.

(mPa) of a working solution similar to that used in Example 1 is presented in Table V.

TABLE I

PERCENT SECOND PHASE REMOVAL FROM WORKING SOLUTION

| Example No. | Noncyclic Hydrocarbon | Titer | Temp. °C. | Wt. % Second Phase | Second Phase Composition % Inerts | Second Phase Composition % Working Comp. |
|---|---|---|---|---|---|---|
| 1 | n-heptane | 0 | 22 | 3.04 | 91 | 9 |
|   |   |   | 0 | 4.01 | 89 | 11 |
|   |   |   | −10 | 4.45 | 89 | 11 |
| 2 | n-heptane | 33 | 22 | 5.33 | 87 | 13 |
|   |   |   | 0 | 7.40 | 86 | 14 |
|   |   |   | −10 | 9.32 | 85 | 15 |
| 3 | n-heptane | 64 | 22 | 6.03 | 86 | 14 |
|   |   |   | 0 | 8.54 | 83 | 17 |
|   |   |   | −10 | 10.42 | 84 | 16 |
| 4 | n-heptane | 84 | 22 | 8.97 | 84 | 16 |
|   |   |   | 0 | 10.43 | 78 | 22 |
|   |   |   | −10 | 10.49 | 81 | 19 |
| 5 | n-heptane | 0 | 22 | 4.46 | 91 | 9 |
|   |   |   | 0 | 5.33 | 91 | 9 |
|   |   |   | −10 | 6.31 | 88 | 12 |
| 6 | n-heptane | 34 | 0 | 5.10 | 89 | 11 |
| 7 | n-heptane | 64 | 0 | 8.60 | 84 | 16 |
| 8 | n-heptane | 84 | 0 | 10.30 | 78 | 22 |

TABLE II

TWO STAGE PROCESS
PERCENT SECOND PHASE REMOVED FROM WORKING SOLUTION

| Example No. | Noncyclic Hydrocarbon | Titer | Temp. °C. | Wt % Second Phase | Second Phase Composition % Inerts | Second Phase Composition % Working Comp. |
|---|---|---|---|---|---|---|
| 9 | n-heptane | 0 | 5 | 3.51 | 3.12 | 0.36 |
| 9a | n-heptane | 34 | 22 | 2.12 | 1.88 | 0.24 |
|   |   | 34 | 0 | 3.91 | 3.41 | 0.50 |
|   |   | 34 | −10 | 4.75 | 4.08 | 0.67 |
| 9b | n-heptane | 65 | 22 | 3.66 | 3.09 | 0.57 |
|   |   | 65 | 0 | 7.00 | 5.66 | 1.34 |
|   |   | 65 | −10 | 7.72 | 6.30 | 1.42 |
| 9c | n-heptane | 85 | 22 | 4.94 | 4.13 | 0.81 |
|   |   | 85 | 0 | 7.67 | 5.94 | 1.73 |
|   |   | 85 | −10 | 8.27 | 6.27 | 2.00 |

EXAMPLE 10

A neutral working solution was prepared containing by weight 10% working compound, 40% methylcyclohexyl acetate and 40% C9 alkylated benzene and 10% inerts which were previously removed from a commercial working solution thereby providing a simulated impure working solution with a different solvent system from the prior examples. One part of the working solution was added to about 7 parts of n-pentane as in Example 1. The results are presented in Table III.

EXAMPLE 11

Example 10 was repeated using instead a neutral working solution containing 20% working compound, 10% trioctal phthalate, 10% N,N-diethyl-N',N'-di-n-butyl urea, 53% C9 alkylated benzene and 7% inerts. Results are presented in Table III.

EXAMPLE 12

A variety of commercially-available compounds were screened by the qualitative test procedure to determine whether or not they were capable of separating a second phase from an impure working solution. Those compounds were tested and the results are listed in Table IV together with literature data where available.

EXAMPLE 13

The effect of purifying impure working solution using different procedures was demonstrated by determining specific gravity and viscosity in centipoise

TABLE III

PERCENT SECOND PHASE ADDED AND RECOVERED FROM OTHER WORKING SOLUTIONS

| Example | Noncyclic Hydrocarbon | Titer | Temp. °C. | Parts of Inerts Added | Parts of Inerts Recovered |
|---|---|---|---|---|---|
| 10 | n-pentane | 0 |   | 10 | 8 |
| 11 | n-pentane | 0 |   | 7 | 7 |

TABLE IV

QUALITATIVE TESTS FOR FORMATION OF A SECOND PHASE

| Compound | Solubility Parameter | Hydrogen Bonding Index | Dipole Moment | Second Phase Formed |
|---|---|---|---|---|
| Xylene (comm) | 8.8 | 4.5 | 0.4 | No |
| Cyclohexanol | 11.4 | 18.7 | 1.7 | No |
| n-pentane | 7.1 | 0 | 0 | Yes |
| n-hexane | 7.3 | 0 | 0 | Yes |
| n-heptane | 7.5 | 0 | 0 | Yes |
| n-octane | 7.6 | 0 | 0 | Yes |
| n-nonane | 7.7 | 0 | 0 | Yes |
| n-decane | 7.7 | 0 | 0 | Yes |
| n-dodecane | 7.8 | 0 | 0 | Yes |
| Cyclohexane | 8.2 | 0 | 0 | No |
| Methylcyclohexane | 7.8 | 0 | 0 | No |
| 2-methylpentane | N/A | N/A | N/A | Yes |
| Methanol | 14.5 | 18.7 | 1.7 | No |
| Acetone | 9.8 | 9.7 | 2.9 | No |

TABLE IV-continued

QUALITATIVE TESTS FOR FORMATION OF A SECOND PHASE

| Compound | Solubility Parameter | Hydrogen Bonding Index | Dipole Moment | Second Phase Formed |
|---|---|---|---|---|
| Comm. C9 aromatic | 8.7 | 1.5 | 0 | No |
| Ligroin | N/A | N/A | N/A | Yes |
| Mixed C7 | N/A | N/A | N/A | Yes |

TABLE V

EFFECT OF REMOVING INERTS ON SPECIFIC GRAVITY AND VISCOSITY OF WORKING SOLUTION

| Compound Used | Titer | Temp. °C. | S. G. | Viscosity mPa · s |
|---|---|---|---|---|
| Control | — | — | .9632 | 5.598 |
| n-heptane | 84 | 0 | .9454 | 4.185 |
| n-heptane | 84 | −10 | .9413 | 3.882 |
| n-heptane | 0 | 22 | .9602 | 5.394 |
| n-heptane | 0 | 0 | .9580 | 5.483 |
| n-heptane | 0 | −10 | .9571 | 4.367 |
| n-pentane | 34 | 0 | .9496 | 4.547 |
| n-pentane | 64 | 0 | .9445 | 4.264 |
| n-pentane | 84 | 0 | .9412 | 3.724 |
| n-pentane | 0 | 22 | .9530 | 4.579 |
| n-pentane | 0 | 0 | .9502 | 4.331 |
| n-pentane | 0 | −10 | .9496 | 4.401 |

I claim:

1. A process for removing inert contaminants from a working solution containing a working compound for the production of hydrogen peroxide by the cyclic oxidation and reduction of an alkylated anthraquinone comprising the steps of
    (a) combining the working solution and a sufficient quantity of a noncyclic hydrocarbon having a solubility parameter of less than 8, a hydrogen bonding index of 0 and a dipole moment of 0, thereby forming a first liquid phase and a second phase, the second phase having a greater specific gravity than the first liquid phase,
    (b) separating and withdrawing at least a portion of the second phase from the first liquid phase, and
    (c) recovering the noncyclic hydrocarbon from the first liquid phase.

2. The process of claim 1 wherein the solubility parameter of the noncyclic hydrocarbon is 7.5 or less.

3. The process of claim 1 wherein the temperature of the separating and withdrawing step (b) is between −15° C. and 25° C.

4. The process of claim 2 wherein the temperature of the separating and withdrawing step (b) is between −15° C. and 25° C.

5. The process of claim 1 wherein the combining step (a) is effected by adding one part of working solution to 4 to 7 parts of noncyclic hydrocarbon.

6. The process of claim 2 wherein the combining step (a) is effected by adding one part of working solution to 4 to 7 parts of noncyclic hydrocarbon.

7. The process of claim 3 wherein the combining step (a) is effected by adding one part of working solution to 4 to 7 parts of noncyclic hydrocarbon.

8. The process of claim 4 wherein the combining step (a) is effected by adding one part of working solution to 4 to 7 parts of noncyclic hydrocarbon.

9. The process of claim 1 wherein the working solution is neutral working solution with a titer of approximately zero.

10. The process of claim 1 wherein the working solution is in the hydrogenated form.

11. The process of claim 1 wherein the working solution is in the hydrogenated form having a titer of between 35 and 65.

12. The process of claim 6 wherein the working solution is in the hydrogenated form having a titer of between 35 and 65.

13. The process of claim 7 wherein the working solution is in the hydrogenated form having a titer of between 35 and 65.

14. The process of claim 8 wherein the working solution is in the hydrogenated form having a titer of between 35 and 65.

15. A process for removing inert contaminants from a neutral working solution containing a working compound for the production of hydrogen peroxide by the cyclic oxidation and reduction of an alkylated anthraquinone comprising the steps of:
    (a) combining the neutral working solution and a sufficient quantity of a first noncyclic hydrocarbon having a solubility parameter of less than 8, a hydrogen bonding index of 0 and a dipole moment of 0, thereby forming a first liquid phase and a second phase, the second phase having a greater specific gravity than the first liquid phase,
    (b) separating and withdrawing at least a portion of the second phase from the first liquid phase,
    (c) recovering the noncyclic hydrocarbon from the first liquid phase,
    (d) hydrogenating the working solution from step (c), thereby forming a hydrogenated working solution with a titer greater than zero,
    (e) combining the hydrogenated working solution from step (d) and a sufficient quantity of a second noncyclic hydrocarbon having a solubility parameter of less than 8, a hydrogen bonding index of 0 and a dipole moment of 0, thereby forming a first liquid phase of hydrogenated working solution and a second phase of hydrogenated working solution, the second phase of hydrogenated working solution having a greater specific gravity than the first liquid phase of hydrogenated working solution,
    (f) separating and withdrawing at least a portion of the second phase of hydrogenated working solution from the first liquid phase of hydrogenated working solution,
    (g) recovering the second noncyclic hydrocarbon and the purified working solution.

16. The process of claim 15 wherein the hydrogenated working solution has a titer of between 35 and 65.

17. The process of claim 15 wherein the temperatures of the separating and withdrawing steps (b) and (f) are between −15° C. and 25° C.

18. The process of claim 16 wherein the temperatures of the separating and withdrawing steps (b) and (f) are between −15° C. and 25° C.

19. The process of claim 15 wherein the temperatures of the separating and withdrawing steps (b) and (f) are between −10° C. and 0° C.

20. The process of claim 16 wherein the temperatures of the separating and withdrawing steps (b) and (f) are between −10° C. and 0° C.

* * * * *